(12) United States Patent
Hashimoto

(10) Patent No.: US 6,955,951 B2
(45) Date of Patent: Oct. 18, 2005

(54) LIQUID CRYSTAL DISPLAY DEVICE HAVING AN AUXILIARY WIRING

(75) Inventor: Kazuya Hashimoto, Hyogo (JP)

(73) Assignee: Koninklijke Philips Electronics N.V., Eindhoven (NL)

(*) Notice: Subject to any disclaimer, the term of this patent is extended or adjusted under 35 U.S.C. 154(b) by 293 days.

(21) Appl. No.: 10/012,023

(22) Filed: Dec. 5, 2001

(65) Prior Publication Data

US 2003/0016326 A1 Jan. 23, 2003

(30) Foreign Application Priority Data

Dec. 7, 2000 (JP) ...................................... 2000-372358

(51) Int. Cl.$^7$ .............................................. H01L 21/00
(52) U.S. Cl. ....................... 438/149; 257/748; 349/142; 349/143
(58) Field of Search ......................... 257/359, 72, 748, 257/59; 349/148–149, 139, 142–143

(56) References Cited

U.S. PATENT DOCUMENTS

| | | | |
|---|---|---|---|
| 5,349,226 A | | 9/1994 | Kawaguchi et al. ......... 257/347 |
| 5,742,074 A | * | 4/1998 | Takizawa et al. .............. 257/59 |
| 5,774,099 A | * | 6/1998 | Iwasaki et al. ................. 345/87 |
| 5,818,252 A | * | 10/1998 | Fullman et al. .............. 324/765 |
| 5,949,502 A | * | 9/1999 | Matsunaga et al. ........... 349/40 |
| 6,172,410 B1 | * | 1/2001 | Nagata et al. ............... 257/620 |
| 6,246,074 B1 | * | 6/2001 | Kim et al. ..................... 257/48 |
| 6,259,494 B1 | * | 7/2001 | Kawai et al. ................. 349/39 |
| 6,342,931 B2 | * | 1/2002 | Nagata et al. ................. 349/54 |
| 6,406,946 B1 | * | 6/2002 | Takizawa et al. ............ 438/149 |
| 2001/0022568 A1 | * | 9/2001 | Kang ............................ 345/87 |
| 2001/0028418 A1 | * | 10/2001 | Ozaki et al. ................... 349/54 |
| 2004/0005741 A1 | * | 1/2004 | Takenaka ..................... 438/149 |

FOREIGN PATENT DOCUMENTS

| | | | |
|---|---|---|---|
| EP | 404528 | * | 12/1990 |
| JP | 5-333373 | * | 12/1993 |
| JP | 7-234413 | * | 2/1994 |
| JP | 8-248434 | * | 9/1996 |
| JP | 9-101539 | * | 4/1997 |
| JP | 2000-29067 | * | 1/2000 |

* cited by examiner

*Primary Examiner*—Nathan J. Flynn
*Assistant Examiner*—Ahmed N. Sefer

(57) ABSTRACT

To enable freely choose a bus-line to be monitored without such a problem that the bus-line is made corroded. A liquid crystal display device comprising: a substrate (10) in which a display area (10d) is delimited; and two series of bus-lines (4, 5) supported by the substrate, one ends of the bus-lines being located in proximity to one side of the display area, another ends of the bus-lines being located in proximity to another side of the display area which is opposite to the one side of the display area, the two series of bus-lines (4, 5) being arranged to extend over the display area in such a manner that the one series of bus-lines (4) is orthogonal to the other series of bus-lines (5). The display device further comprises: a conductive auxiliary wiring pattern (6h, 6v) which extends in such a manner that the pattern crosses another end(s) of the bus-line(s), which is/are all to be monitored, of the one series of bus-lines (4 or 5) via an electrically insulating layer (7), and which is led out to a predetermined location on a side of one ends of the bus-lines (5 or 4) of the other series to form a coupling portion (6p) capable of electrically connecting to the exterior.

10 Claims, 4 Drawing Sheets

LIQUID CRYSTAL DISPLAY DEVICE HAVING AN AUXILIARY WIRING

BACKGROUND OF THE INVENTION

1. Field of the Invention

The present invention relates to a liquid crystal display device. The invention relates, in particular to a liquid crystal display device having an auxiliary wiring pattern that can make electric characteristics to be observed. The invention also relates to a method of monitoring electric characteristics of bus-lines of a liquid crystal display device by using s.

2. Description of Related Art

Such a type of liquid crystal display device is disclosed in, e.g. a reference of Japanese Patent Application Laid-Open No. 233,514/92 (or the corresponding application, U.S. Pat. No. 5,349,226).

In this reference, there is described a liquid crystal display device having an active matrix board provided with an array of thin film transistors formed in matrix on an insulative substrate, wherein portions of gate bus-line and source bus-line of the thin film transistor array form contact pads for probing of which metallic parts are exposed to the exterior. According to this configuration, under actual operating conditions of the liquid crystal display device, it is possible to easily make a contact of a probe for monitoring a signal waveform of the bus-line with the metallic part, visually, whereby the operation can be checked with no disadvantages including destruction and cut-off of the bus-line.

However, in the prior art, the metallic part as the contact pad, which has been formed in the vicinity of the bus-line on the substrate, is forced to be exposed to the exterior at least when monitoring the waveform. Therefore, the metallic part can suffer some damage due to its contact with the probe, so that the damage may promote metallic corrosion to lead influence such as deterioration of electrical conductivity of the bus-line.

The prior art is a technique that allows only a specific bus-line having been provided with a contact pad to be monitored. Accordingly, it has to always provide a bus-line to be monitored in waveform with a contact pad, and even when all the bus-lines are provided with contact pads beforehand, it may lead a disadvantageous condition that possibly unnecessary bus-lines to be waveform-monitored may be wasted, may cause the above-mentioned corrosion problem and may be inflexible.

SUMMARY OF THE INVENTION

In view of the above-mentioned points, it is an object of the present invention to provide a liquid crystal display device and a method which can freely choose any bus-line to be monitored without such a problem such that the bus-line is made to be corroded.

In order to achieve the object mentioned above, a liquid crystal display device of one aspect according to the present invention, is a liquid crystal display device comprising: a substrate in which a display area is delimited; and two series of bus-lines supported by the substrate, one ends of the bus-lines being located in proximity to one side of the display area, another ends of the bus-lines being located in proximity to another side of the display area which is opposite to the one side of the display area, the two series of bus-lines being arranged to extend over the display area in such a manner that the one series of bus-lines is orthogonal to the other series of bus-lines, the display device further comprising: a conductive auxiliary wiring pattern supported by the substrate, which extends in such a manner that the pattern crosses another end(s) of the bus-line(s), which is/are all to be monitored, of the one series of bus-lines via an electrically insulating layer, and which is led to a predetermined location on a side of one ends of the bus-lines of the other series to form a coupling portion capable of electrically connecting to the exterior in the predetermined location.

In this aspect, the device may further comprise an auxiliary wiring pattern supported by the substrate, which extends in such a manner that the pattern crosses another end(s) of bus-line(s), which is/are all to be monitored, of the other series of bus-lines via an electrically insulating layer, and which is led to a predetermined location on a side of one ends of the bus-lines of the one series to form a coupling portion capable of electrically connecting to the exterior in the predetermined location.

An intersection of the bus-lines and the auxiliary wiring pattern may exist out of the display area, and the auxiliary wiring pattern is drawn in a form of substantially a straight line.

The auxiliary wiring pattern may be formed from an electrically conductive substance capable of being melted by a welding process in which an intersection of the bus-line and the auxiliary wiring pattern is irradiated with laser light; and the insulating layer may be formed from an electrically insulating substance capable of being destroyed by the welding process, the insulating layer causing the melted conductive substance to couple the other end of the bus-line with the auxiliary wiring pattern at the intersection through a through-hole formed after the insulating layer has been destroyed at the intersection.

The auxiliary wiring pattern can be cut off between the intersections by means of irradiation of laser light.

The device may further comprise a driving circuitry unit connected to the one ends of the bus-lines, for supplying signals for driving pixels.

The bus-lines may be bus lines for forming storage capacitors having a auxiliary function of holding pixel data in co-operation with pixel electrodes of the display device.

The present invention also offers a monitoring method wherein an electrical characteristic of any of the bus-lines is monitored using the coupling portion in the device of each of the above-mentioned aspects.

Here, an electrically conductive surface of the coupling portion may be exposed, and the electrical characteristic may be monitored with the electrically conductive surface.

Otherwise, the coupling portion may be connected to an extension wiring pattern which is electrically conductive and supported by a TAB tape, and the electrical characteristic may be monitored with an exposed surface of the extension wiring pattern.

In other examples, the coupling portion may be connected to an extension wiring pattern which is electrically conductive and supported by a TAB tape, and the extension wiring pattern may be connected to electrically conductive pad supported by a printed-circuit board, the electrical characteristic being monitored with the pad.

The present invention is based on the recognition that the constitution intended to monitor a signal waveform directly from the bus-line is easy to cause corrosion of the bus-line that is strongly relating to an display quality. The present invention has been conceived by effort to pursue a constitution in which a bus-line to be monitored is not decided at first and only (a) bus-line(s) necessary to be monitored at the time of real examination can be chosen freely while preventing the corrosion problem.

According to the present invention, the auxiliary wiring pattern crosses bus-line(s) which is/are all to be monitored (which has/have a possibility to be monitored), via an insulating layer, but does not connect to the bus-line(s). This constitution makes a monitored line to be freely chosen even after having finished manufacturing a substrate assembly having bus-lines and an auxiliary wiring pattern. Then it is possible to select a bus-line considered to be truly necessary on an actual monitoring stage and to connect the selected bus-line to the auxiliary wiring pattern, whereby a monitoring operation with a minimal number of the bus-lines can be performed through the auxiliary wiring pattern. Moreover, since the auxiliary wiring pattern can be cut off at some midpoint after the monitoring, influence of the auxiliary wiring pattern on the bus-lines (e.g. the increase of resistance, parasitic capacitance, etc.) can be minimized. The bus-lines can not be connected directly to the exterior during the monitoring, so that they are hard to corrode.

DESCRIPTION OF THE PREFERRED EMBODIMENT(S)

Now the above-mentioned aspects and other aspects according to the present invention will be described in more detail with reference to the accompanying drawings.
[Embodiment 1]

Figure 1:
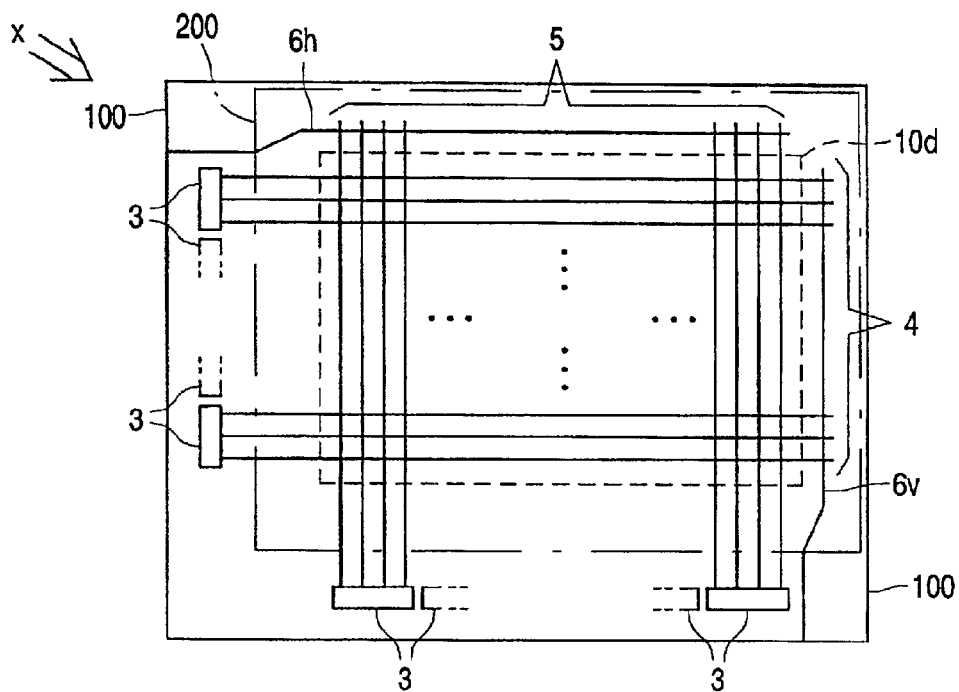
FIG. 1 is a plan view of a liquid crystal display panel for explaining a general outline of an auxiliary wiring pattern according to the present invention.

FIG. 1 schematically shows in a plan view a configuration of one substrate assembly 100 used in one embodiment of liquid crystal display device according to the invention.

It should be noted that: although the one substrate assembly 100 is assembled with another substrate assembly 200 with being faced to each other and a liquid crystal medium is encapsulated between them to finally make a liquid crystal display device (panel), especially the one substrate assembly's configuration will be described hereinafter for clarity of the explanation.

In FIG. 1, a predetermined display area 10d is defined in a substrate body (description later) of the substrate assembly 100, wherein images to be displayed are formed. The substrate assembly 100 is provided with two series of bus-lines 4 and 5 which are arranged to extend orthogonally to each other over the display area 10d. The one series of bus-lines 4 horizontally run in parallel from one edge side of the display area 10d (the left side in the Figure) to another edge side opposite to the one edge side (the right side). The other series of bus-lines 5 vertically run in parallel from further one edge side of the display area 10d (the lower side) to another edge side opposite to the further one edge side (the upper side). The bus-lines 4 and 5 are formed from an electrically conductive material that can melt when laser light is incident thereon, e.g., not only metals that can easily melt, such as aluminum but also high melting point metals such as chromium or molybdenum. Although these bus-lines have a configuration in which they are supported directly or via some layer on the substrate body that is an actual base in the substrate assembly 100, the configuration is omitted here.

Figure 2:
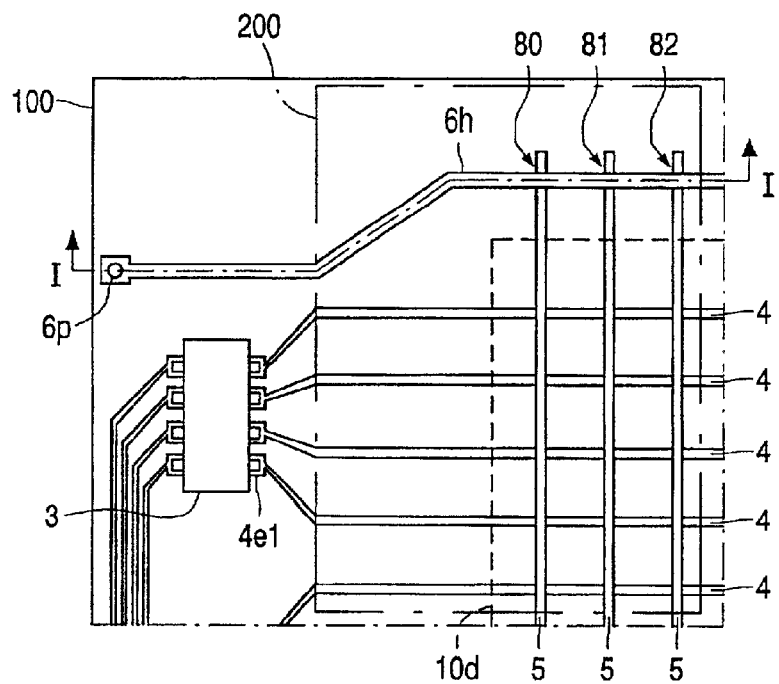
FIG. 2 is a partly magnified plan view of the display panel, showing an auxiliary wiring pattern and a manner of external connection thereof in accordance with a first embodiment of the invention.

The substrate assembly 100 is also provided, in the vicinity of the left and lower sides thereof, with driver circuit units, the so-called driver ICs 3 in a COG (Chip On Glass) style in this example. These driver ICs 3 have respective output terminals connected to one ends of the bus-lines 4 and 5 and supply pixel driving signals from the output terminals to the bus-lines 4 and 5 individually. For example, if the liquid crystal display device is an active matrix type based on an array of TFTs (Thin Film Transistors), the bus-lines 4 are supplied with driving signals for the gates of the TFTs and the bus-lines 5 are supplied with driving signals for the sources of the TFTs, the driving signals serving as the pixel driving signals. One ends of the bus-lines 4 form pad terminals 4e1 for making contact with the terminals of the driver ICs 3 as shown in FIG. 2, and one ends of the bus-lines 5 form in a like manner. FIG. 2 is a magnified view of part of the display device, pointed by an arrow x in FIG. 1

In this embodiment, the substrate 100 is provided not only with the bus-lines 4 and 5 but also with auxiliary wiring patterns 6h and 6v for monitoring the signal waveforms on these bus-lines. The auxiliary wiring patterns 6h and 6v are electrically conductive and are formed in such a manner as to extend to the outside area of the above-mentioned display area 10d in horizontal and vertical directions, respectively. The auxiliary wiring patterns 6h and 6v are preferably formed from an electrically conductive material that can melt when it is applied with laser light. For the patterns 6h and 6v, easily meltable metals such as aluminum may be used, and also high melting point metals such as chromium or molybdenum may be used. The auxiliary wiring patterns are subjected to the so-called laser welding based on laser irradiation at the later stage. The way of the laser welding will be described later.

Figure 3:
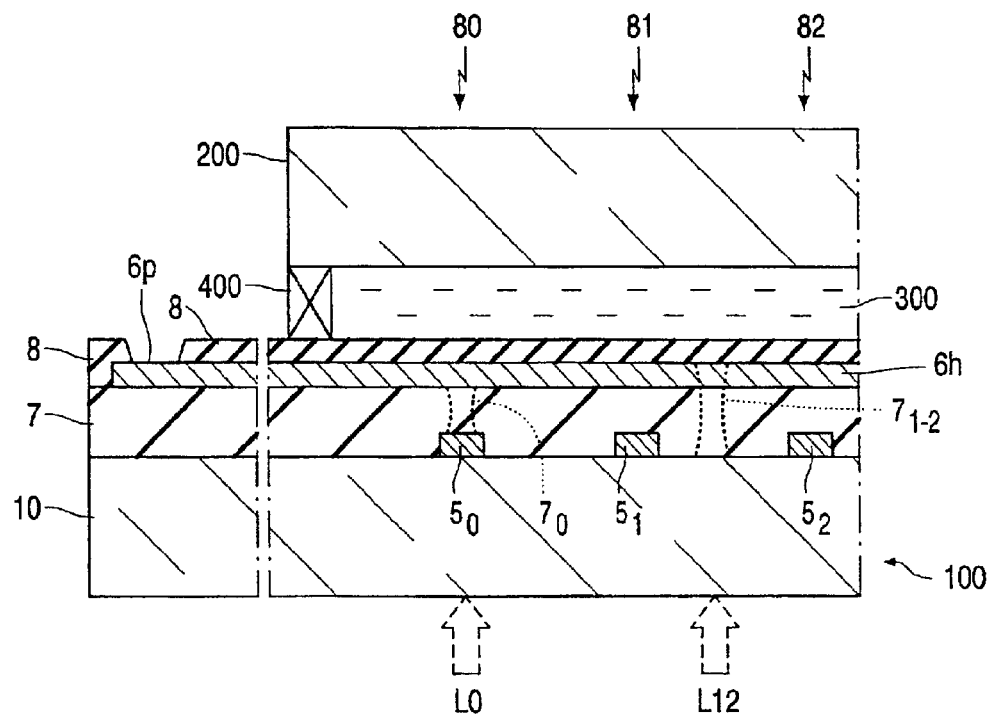
FIG. 3 is a I—I section view of FIG. 2, by which a manner of monitoring a signal using the auxiliary wiring pattern is explained.

The one auxiliary wiring pattern 6h is extended in such a manner that it intersects, in this example, all of the other ends (the upper side ends in the Figure) of the vertical bus-lines 5 via an electrically insulating layer 7 (see FIG. 3). The pattern 6h is also led out to a predetermined location of one end side (the left side in the Figure, that is a side on which the connecting terminals 4e1 are formed for the driver ICs 3) of the horizontal bus-line 4. In this example, the predetermined location is at a portion outside a wiring area for the driver ICs 3 (the upper-left corner section of the substrate assembly 100). FIG. 3 shows a I—I section along the auxiliary wiring pattern 6h in the configuration in FIG. 2.

The other auxiliary wiring pattern 6v is extended in such a manner that it intersects, in this example, all of the other ends (the right side ends in the Figure) of the horizontal bus-lines 4 via the insulating layer 7 (see FIG. 3). It is led out to a predetermined location of one end side (the lower side in the Figure, that is a side on which the connecting terminals are formed for the driver ICs 3) of the vertical bus-lines 5. In the example, the predetermined location is at a portion outside a wiring area for the driver ICs 3 (the lower-right corner section of the substrate assembly 100).

Those predetermined locations are chosen as locations that allow signal waveforms to be easily monitored. In the case of the auxiliary wiring pattern 6h, it forms a coupling portion 6p that is electrically connectable to the exterior, in the closest position to an edge of the substrate assembly 100, in this example. The coupling portion 6p serves as a pad for contact with a probe. Similarly, the other auxiliary wiring pattern 6v forms a coupling portion.

Since the auxiliary wiring patterns 6h, 6v of this embodiment run in form of substantially a straight line along the main bus-lines outside the display area 10d, they can advantageously transmit a signal at almost the shortest distance to the corresponding coupling portion with no problem of image display quality.

[Signal Monitoring]

Next, a more materialized way will be described, in which a signal waveform on a bus-line is monitored using the above-mentioned auxiliary wirings. It should be noted that usage of the one auxiliary wiring pattern 6h will be here explained as a representative example, but the other auxiliary wiring pattern 6v can be similarly explained As shown in FIG. 3, the auxiliary wiring pattern 6h crosses the bus-lines 5 via the insulating layer 7, the pattern 6h being supported by the glass substrate 10. The auxiliary wiring pattern 6h is covered with a resist 8 as an insulating film except for the above-mentioned coupling portion 6p. That is, only the coupling portion 6p is exposed to the exterior.

Thus configured substrate assembly 100 is combined with another substrate assembly 200, facing to each other, and then a liquid crystal medium 300 is sealed in between them. For the sealing, a sealant member 400 is used. It should be noted that in FIG. 3 elements/components unnecessary for explanation of the gist of the invention are omitted for clarity.

For example, when a bus-line $5_0$ that is the closest to the left side is to be used to monitor a signal waveform, a laser beam $L_0$ is made to impinge on a point $q_0$ of intersection of the other end portion of the bus-line $5_0$ and the auxiliary wiring pattern 6h through the substrate 10. By means of this, a portion of the bus-line $5_0$ on which the laser beam has impinged is made melted, and a portion of the insulating layer 7 on which the laser beam has impinged is made destroyed to form a through-hole $7_0$, through which the molten metal of the bus-line $5_0$ reaches a portion of the auxiliary wiring pattern 6h corresponding to the crossing point $q_0$. Thus a connection is made between the bus-line $5_0$ and the auxiliary wiring pattern 6h.

It should be noted that: in such a welding process it is preferable that not only the bus-line $5_0$ but also the corresponding portion of the pattern 6h is appropriately welded so as to mix their substances, in respect of reliability of electrical connection.

Therefore, after connecting the bus-line $5_0$ to the auxiliary wiring pattern 6h, a person in charge of check or a checker equipment can bring, e.g. a probe into contact with the coupling portion 6p so as to monitor a signal waveform on the bus-line 5.

On the other hand, the following description is about a cutting-off process (amputation) in which the bus-line is separated from the auxiliary wiring pattern 6h.

For example, when a bus-line $5_1$ that is the second one from the leftmost side is to be separated, a laser beam $L_{12}$ impinges on a position between a crossing point $q_1$, at which the other end portion of the bus-line $5_1$, intersects the auxiliary wiring pattern 6h and another crossing point $q_2$ at which the other end portion of the next bus-line $5_2$ intersects the auxiliary wiring pattern 6h, through the substrate 10. In this way, a hole is bored in the portion of the insulating layer 7 on which the laser beam has been incident, through which the auxiliary wiring pattern 6h is cut off. Then, similarly, moving to a new position between the crossing position $q_0$ and the crossing position $q_1$, the laser beam impinges on the new position via the substrate 10 so as to split the auxiliary wiring pattern 6h.

Accordingly, since the auxiliary wiring pattern 6h can be split at both sides of the bus-line $5_1$, even after the bus-line $5_1$ has been connected to the auxiliary wiring pattern 6h the electrical connection of the bus-line 51 with the external conductive surface 6p through the auxiliary wiring pattern 6h can be discontinued.

By appropriately and repeatedly performing the above-mentioned welding process and cutting process while monitoring signals, it is possible to monitor the signals for all of the bus-lines 5 that are across the auxiliary wiring pattern 6h. More specifically, a bus-line that is the most remote from the pad 6p is set to or chosen as a target to be signal-monitored at first, and the signal-monitoring are carried out from the most remote bus-line toward the pad, one after another. In other words, repetitive steps are executed, which include a step of connecting a bus-line to be monitored to the auxiliary wiring pattern by means of the welding process, a step of signal-monitoring on the connected bus-line, a step of cutting off a portion of the auxiliary wiring pattern, located at the left side (the pad side) of the bus-line by means of the cutting process, a step of connecting the next bus-line on the pad side to the auxiliary wiring pattern by means of the welding process, and so on.

As to the welding process and the cutting process reference can be made in Japanese Patent Application Laid-Open No. 151,177/91 (or the corresponding U.S. Pat. No. 5,038, 950) and Japanese Patent Application Laid-Open No. 119, 349/93 (or the corresponding European Patent Application No. 0 539 981 A1).

Although it has been described that impingement of the laser light from the side of the substrate 10 achieves the welding and cutting processes, impingement of laser light from a side (the upper side in FIG. 3) opposite to the substrate 10 may accomplish the similar welding and cutting processes if it is at a stage prior to a stage of assembling the upper side substrate assembly 200 with the other one.

[Embodiment 2]

Figure 4:
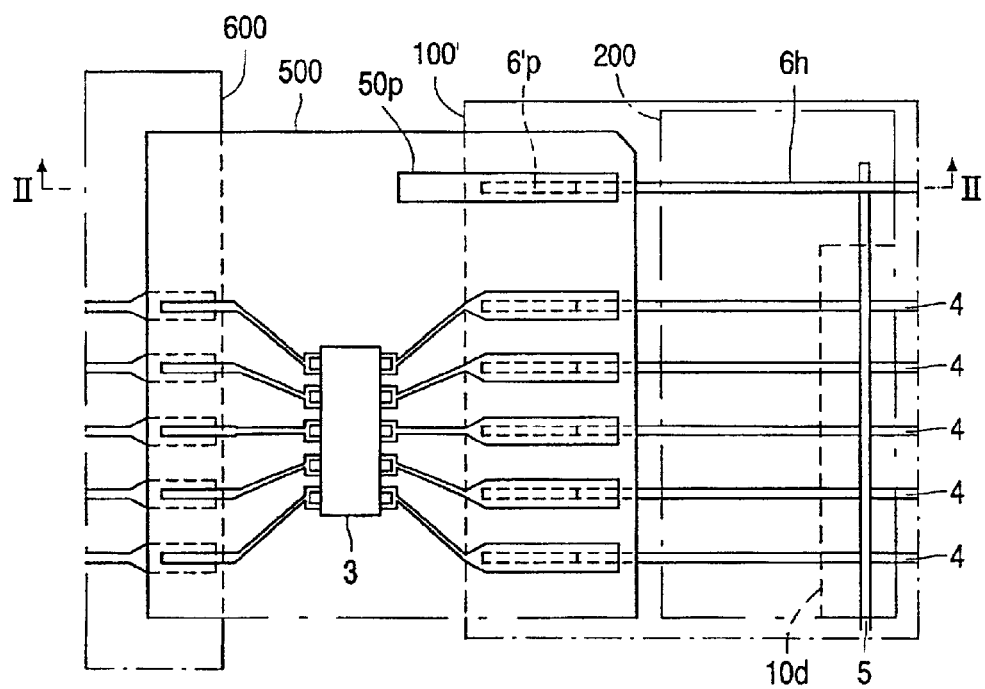
FIG. 4 is a partly magnified plan view of the display panel, showing an auxiliary wiring pattern and a manner of external connection thereof in accordance with a second embodiment of the invention.

FIG. 4 schematically shows in a plan view an arrangement of one substrate assembly and the surrounding parts combined with it, which are used in a liquid crystal display device according to another embodiment of the present invention.

In a substrate assembly 100' in FIG. 4, the driver ICs 3 are connected to the bus-lines 4 and 5 by means of TAB (Tape Automated Bonding) style. Therefore, as also seen from FIG. 5 that shows a II—II sectional view of FIG. 4, the auxiliary wiring pattern 6h has a pattern shape and a coupling portion 6p', which are suitable to be coupled at its end portion with an extension wiring pattern 50p formed on a TAB tape 500.

The driver ICs 3 are mounted on the TAB tape 500 on which their respective connecting patterns are formed for terminals of the ICs. These connecting patterns form connecting pads at edge portions on both the right and left sides of the tape 500, the pads being for connection of one ends of the bus-lines 4 or 5 in the substrate 100' and for connection of the circuits mounted on a printed circuit board (PCB) 600.

Coupling of the coupling portion 6p' to the extension wiring pattern 50p is achieved by sandwiching the well-known anisotropic electrically-conductive material 50A between them and then performing thermo-compression bonding.

Figure 5:
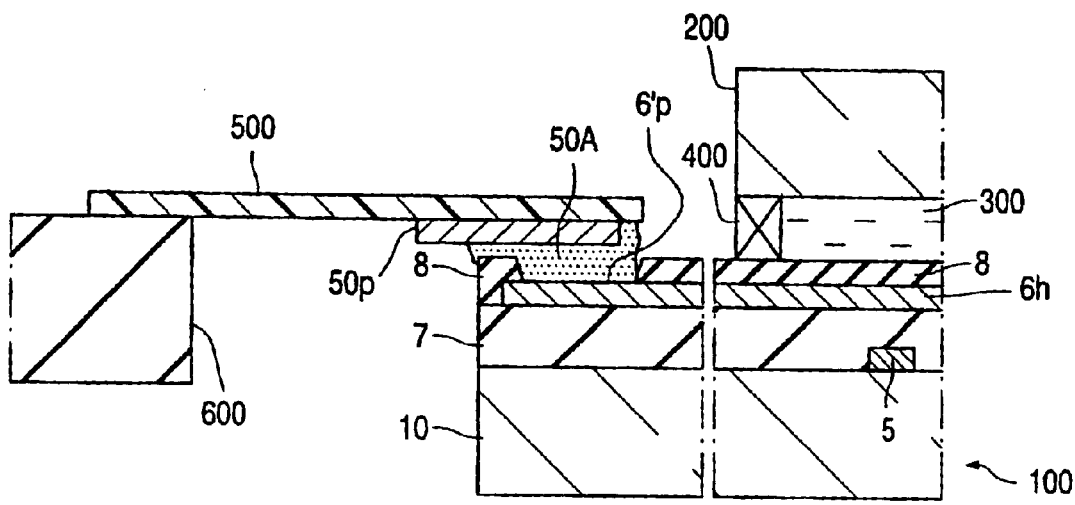
FIG. 5 is a II—II section view of FIG. 4.

As shown in FIG. 5, the extension wiring pattern 50p is coupled with the auxiliary wiring pattern 6p' at its one end, whereas another end is exposed to the external. The exposed surface allows a signal waveform on the bus-line to be monitored.

[Embodiment 3]

Figure 6:
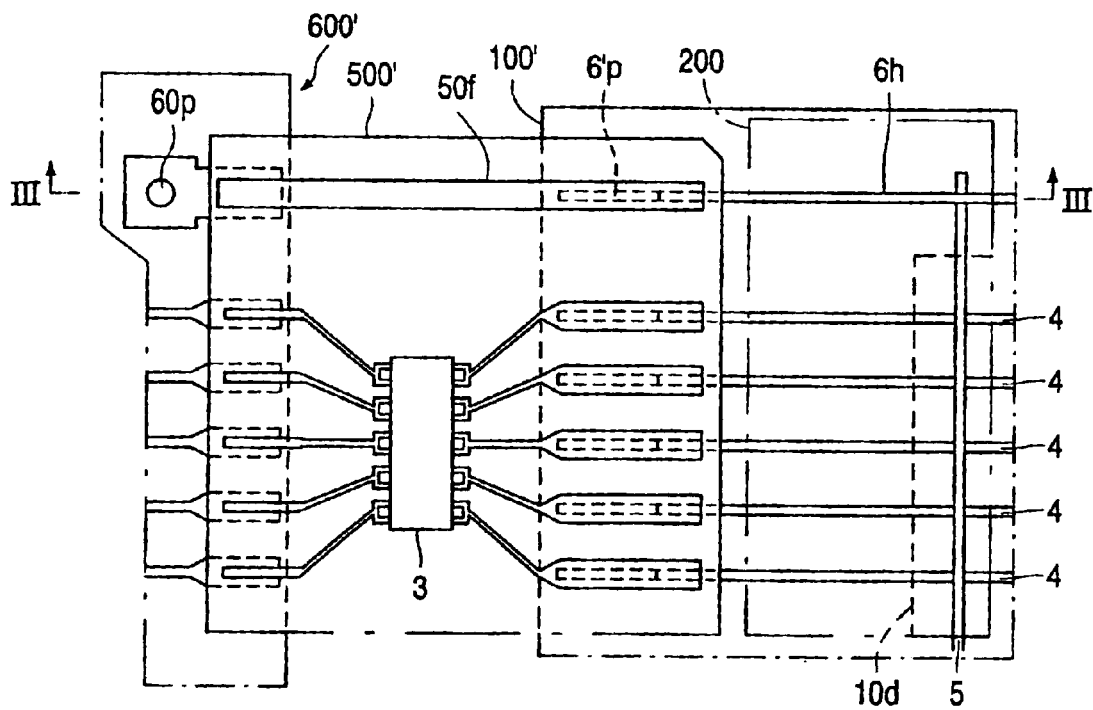
FIG. 6 is a partly magnified plan view of the display panel, showing an auxiliary wiring pattern and a manner of external connection thereof in accordance with a third embodiment of the invention.

FIG. 6 schematically shows in a plan view an arrangement of one substrate assembly and the surrounding parts combined with it, which are used in a liquid crystal display device according to a further embodiment of the present invention.

The substrate assembly 100' in FIG. 6 is also intended to connect the driver ICs 3 to the bus-lines 4 and 5 in the TAB scheme, for the purpose of which it has a coupling portion 6p' similar to that in FIG. 5.

However, the TAB tape 500' has an extension wiring pattern 50f that extends longer than the above-mentioned extension wiring pattern 50p further up to the print board 600'. The extension wiring pattern 50f connects to the coupling portion 6p'. The print board 600' is provided at its edge side with a probe pad 60p different from a connecting pad led from a connecting pattern for a circuit mounted on the print board 600'. The extension wiring pattern 50f is made contact with the connecting pad 60p, e.g. by means of solder 60A.

Figure 7:
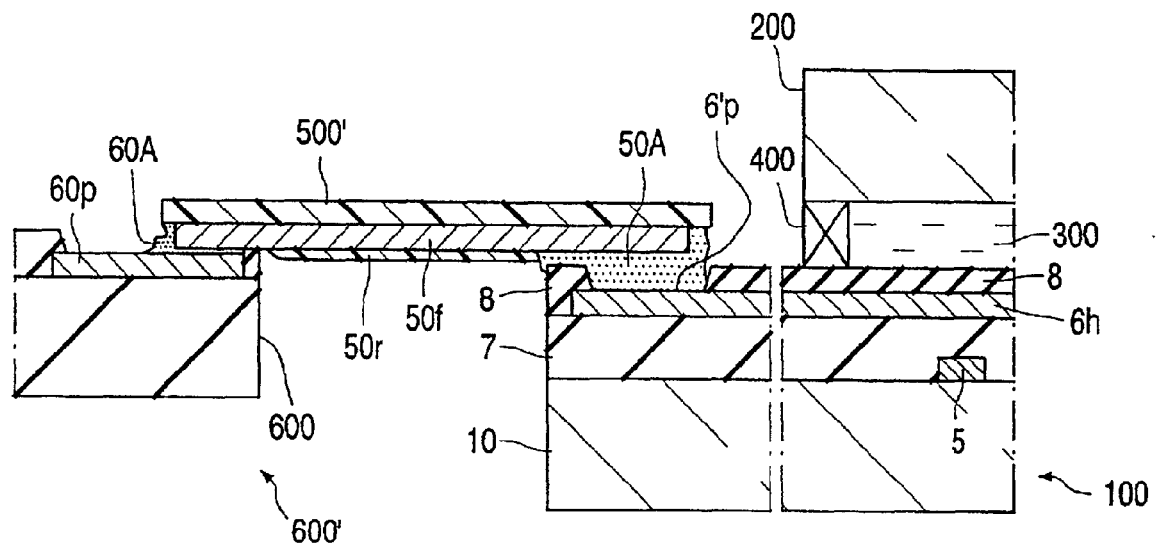
FIG. 7 is a III—III section view of FIG. 6.

As shown in FIG. 7, the extension wiring pattern 50f is coupled with the auxiliary wiring pattern 6p' on the LCD substrate assembly 100 at its one end, whereas the other end of the pattern 50f is coupled with the pad 60p on the print board 600'. Then the pad 60p is exposed to the exterior. Therefore, the pad allows a signal waveform on the bus-line to be monitored.

It should be noted that the extension wiring pattern 50f is electrically isolated by a resin film 50r except for connective end-portions of both sides. Accordingly, there is no external exposure of the pattern in the TAB tape 500'.

[Modification]

Figure 8:
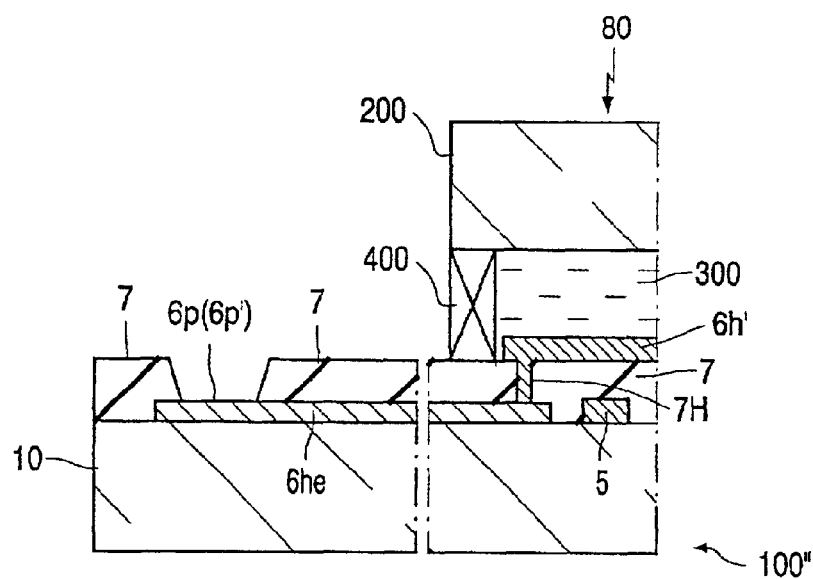
FIG. 8 is a section view showing a modification of the substrate assembly.

FIG. 8 shows a modification of the substrate assembly 100.

As can be seen from FIG. 8, the auxiliary wiring pattern 6h' is not directly led out of an overlapping area in which the substrate assembly 100" and the substrate assembly 200 are overlapped one another, and is coupled with an ending auxiliary wiring pattern 6he formed in the same level of layer as the bus-line 5 via a through-hole 7H.

The ending wiring pattern 6he extends to the vicinity of an edge side of the substrate assembly 100 beyond the overlapping area and forms the above-mentioned coupling portion 6p (or 6p').

Such a modification can be applied to the above-mentioned embodiments, too and can obviously obtain the similar effects and advantages mentioned above, too.

The foregoing embodiments and modifications are different from the prior art mentioned earlier in that the external connection is made on an extended pattern led out from the bus-line via the insulating layer 7, thereby taking a configuration that is hard to exert an influence such as damage or corrosion upon the bus-line. Furthermore, it is advantageously possible to freely choose only a bus-line that has been necessary to be monitored in actuality, even after forming the pattern. In addition, since the bus-line can be separated from the auxiliary wiring pattern after monitoring, it is possible to avoid a problem of increase of resistance or parasitic capacitance. Anyway, these advantages are yielded by such a configuration that the auxiliary wiring pattern is beforehand made to cross all of the bus-lines that are necessary via the insulating layer and at the same time the external connective point is located far from the bus-lines.

For the above-mentioned coupling portions 6p and 6p', an electrical conductive film of, e.g. ITO (Indium Tin Oxide) that is strong against metallic corrosion (oxidation) is preferably (but not exclusively) used.

It is noted that other various modifications can be realized in the present invention. For example, a plurality of auxiliary wiring patterns may be provided either horizontally or vertically in the display area, instead of a single auxiliary wiring pattern in each of horizontal and vertical directions.

Although use of the auxiliary wiring for monitoring a signal waveform on the bus-line has been described in the above embodiments, the other different parameters as to electrical characteristics of the bus-line than the signal waveform can be monitored and measured, including resistance etc.

More noticeably, bus-lines to which the present invention can be applied are not restricted to bus-lines used as electrode lines for driving directly the so-called pixels. In other words, the present invention can be applied to, e.g., the so-called Cs-electrode bus lines for forming storage capacitors having an assistant holding function of the pixel data, cooperating with the pixel electrodes of the display device. Such bus-lines are disclosed in Japanese Patent Application Laid-Open No. 209,668/95 etc., and the references can be made here.

The above-mentioned embodiments are directed to mounting arrangements according to the COG scheme and the TAB scheme. However, the present invention can be basically applied to the other scheme, such as an electrically conductive rubber connector scheme, a heat seal scheme, or a CIG (Circuit Integrated Glass) scheme.

In addition, an active matrix type liquid crystal display device has been described in the above-mentioned embodiments, but the present invention can be applied to a passive matrix type.

The preferred embodiments described herein are therefore illustrative and not restrictive, the scope of the present invention being indicated by the appended claims and all variations which come within the meaning of the claims are intended to be embraced therein.

What is claimed is:

1. A method for monitoring a liquid crystal display device, comprising:

a substrate in which a display area is delimited;

two series of bus-lines supported by the substrate, one ends of the bus-lines being located in proximity to one side of the display area, another ends of the bus-lines being located in proximity to another side of the display area which is opposite to the one side of the display area, the two series of bus-lines being arranged to extend over the display area in such a manner that the one series of bus-lines is orthogonal to the other series of bus-lines; and a conductive auxiliary wiring pattern supported by the substrate, which extends in such a manner that the pattern crosses another end(s) of the bus-line(s), which is/are all to be monitored, of the one series of bus-lines via an electrically insulating layer, and which is led to a predetermined location on a side of one ends of the bus-lines of the other series to form a coupling portion electrically connectable to an exterior in the predetermined location, the method comprising monitoring an electrical characteristic of any of the bus lines using the coupling portion of the device, wherein the coupling portion is connected to an extension wiring pattern which is electrically conductive and supported by a TAB tape, and wherein the electrical characteristic is monitored with an exposed surface of the extension wiring pattern.

2. A method for monitoring a liquid crystal display device, comprising:

a substrate in which a display area is delimited;

two series of bus-lines supported by the substrate, one ends of the bus-lines being located in proximity to one side of the display area, another ends of the bus-lines being located in proximity to another side of the display area which is opposite to the one side of the display area , the two series of bus-lines being arranged to extend over the display area in such a manner that the one series of bus-lines is orthogonal to the other series of bus-lines; and a conductive auxiliary wiring pattern supported by the substrate, which extends in such a manner that the pattern crosses another end(s) of the bus-line(s), which is/are all to be monitored, of the one series of bus-lines via an electrically insulating layer, and which is led to a predetermined location on a side of one ends of that bus-lines of the other series to form a coupling portion electrically connectable to an exterior in the predetermined location, the method comprising monitoring an electrical characteristic of any of the bus lines using the coupling portion of the device, wherein the coupling portion is connected to an extension wiring pattern which is electrically conductive and supported by a TAB tape, and wherein the extension wiring pattern is connected to an electrically conductive pad supported by a printed circuit board, the electrical characteristic being monitored with the pad.

3. In a liquid crystal display device comprising first and second sets of bus-lines each extending, the two sets of bus-lines being arranged to extend across the display area in such a manner that the first set of bus-lines is orthogonal to the second set of bus-lines, a method of monitoring electrical characteristics of at least one of the bus-lines, comprising:

electrically connecting a first bus line of the first set of bus lines to an auxiliary wiring pattern extending generally orthogonally across one end of each of the first set of bus lines outside the display area, the auxiliary wiring pattern having a coupling portion electrically connectable to a exterior of the device;

monitoring an electrical characteristic of the first bus line using the coupling portion of the auxiliary wiring pattern;

cutting the auxiliary wiring pattern to electrically disconnect the first bus line from the coupling portion of the auxiliary wiring pattern; and electrically connecting a second bus line of the first set of bus lines to the auxiliary wiring pattern.

4. The method of claim 3, wherein cutting the auxiliary wiring pattern comprises applying a laser beam to a portion of the auxiliary wiring pattern between the coupling portion, and an intersection of the first bus line and the auxiliary wiring pattern.

5. In a liquid crystal display device comprising a first substrate and a second substrate and a liquid crystal material disposed therebetween, the first substrate having first and second sets of bus-lines each extending, the two sets of bus-lines being arranged to extend across the display area in such a manner that the first set of bus-lines is orthogonal to the second set of bus-lines, a method of monitoring electrical characteristics of at least one of the bus-lines, comprising:

electrically connecting a first bus line of the first set of bus lines to an auxiliary wiring pattern extending generally orthogonally across one end of each of the first set of bus lines outside the display area, the auxiliary wiring pattern having a coupling portion uncovered by the second substrate; and monitoring an electrical characteristic of the first bus line using the coupling portion of the auxiliary wiring pattern uncovered by the second substrate.

6. The method of claim 5, wherein electrically connecting the first bus line to the auxiliary wiring pattern comprises melting the first bus line and destroying an insulating layer between the first bus line and the auxiliary wiring pattern.

7. The method of claim 6, wherein melting the first bus line and destroying an insulating layer between the first bus line and the auxiliary wiring pattern comprises applying a laser beam to an intersection of the first bus line and the auxiliary wiring pattern.

8. The method of claim 5, further comprising:

cutting the auxiliary wiring pattern to electrically disconnect the first bus line from the coupling portion of the auxiliary wiring pattern; and electrically connecting a second bus line of the first set of bus lines to the auxiliary wiring pattern.

9. The method of claim 8, wherein cutting the auxiliary wiring pattern comprises applying a laser beam to a portion of the auxiliary wiring pattern between the coupling portion, and an intersection of the first bus line and the auxiliary wiring pattern.

10. The method of claim 5, further comprising:

electrically connecting a first bus line of the second set of bus lines to a second auxiliary wiring pattern extending generally orthogonally across one end of each of the second set of bus lines outside the display area, the second auxiliary wiring pattern having a coupling portion electrically connectable to the exterior of the device; and monitoring an electrical characteristic of the first bus line of the second set of bus lines using the coupling portion of the second auxiliary wiring pattern.

* * * * *